United States Patent
Zhi (10) Patent No.: US 12,526,461 B2
(45) Date of Patent: Jan. 13, 2026

(54) METHOD AND APPARATUS FOR ALLOCATING RESOURCE OBJECTS BASED ON LIVE STREAMING ROOMS, AND DEVICE AND STORAGE MEDIUM THEREOF

(71) Applicant: BIGO TECHNOLOGY PTE. LTD., Mapletree Business (SG)

(72) Inventor: Yuhui Zhi, Guangzhou (CN)

(73) Assignee: BIGO TECHNOLOGY PTE. LTD., Mapletree Business (SG)

( * ) Notice: Subject to any disclaimer, the term of this patent is extended or adjusted under 35 U.S.C. 154(b) by 87 days.

(21) Appl. No.: 18/716,632

(22) PCT Filed: Nov. 30, 2022

(86) PCT No.: PCT/CN2022/135224
§ 371 (c)(1),
(2) Date: Jun. 5, 2024

(87) PCT Pub. No.: WO2023/103846
PCT Pub. Date: Jun. 15, 2023

(65) Prior Publication Data
US 2025/0047916 A1   Feb. 6, 2025

(30) Foreign Application Priority Data
Dec. 7, 2021 (CN) .......................... 202111483594.2

(51) Int. Cl.
*H04N 21/242* (2011.01)
*H04N 21/2187* (2011.01)

(52) U.S. Cl.
CPC ....... *H04N 21/242* (2013.01); *H04N 21/2187* (2013.01)

(58) Field of Classification Search
None
See application file for complete search history.

(56) References Cited

U.S. PATENT DOCUMENTS 9,160,607 B1 * 10/2015 Froese .................... H04L 43/02
2004/0107250 A1   6/2004 Marciano
(Continued)

FOREIGN PATENT DOCUMENTS

| CN | 108289225 A | 7/2018 |
| CN | 109756504 A | 5/2019 |

(Continued)

OTHER PUBLICATIONS

International search report of PCT application No. PCT/CN2022/135224 issued on Feb. 13, 2023.
(Continued)

*Primary Examiner* — Cai Y Chen
(74) *Attorney, Agent, or Firm* — Dilworth & Barrese, LLP; Michael J. Musella, Esq.

(57) ABSTRACT

Provided is a method for allocating resource objects based on live streaming rooms. The method is applicable to a primary node on a server side, and includes: acquiring synchronization data and local data corresponding to a predetermined resource object in a target live streaming room, wherein the synchronization data is synchronously stored between the primary node and a secondary node, and includes a waiting queue of waiting users; and the local data is stored in the primary node, and includes second user data of an invited user; determining a target user based on a sequence of the waiting users in the waiting queue; acquiring a current state of the target user by comparing the synchronization data and the local data for the target user; and determining, based on the current state, whether to send an invitation for allocating the predetermined resource object to a target user side.

18 Claims, 4 Drawing Sheets

(56) References Cited

U.S. PATENT DOCUMENTS

| | | |
|---|---|---|
| 2007/0198316 A1 | 8/2007 | Boland et al. |
| 2010/0266116 A1 | 10/2010 | Stolyar et al. |
| 2014/0156592 A1 | 6/2014 | Bank et al. |
| 2021/0357834 A1 | 11/2021 | Singh et al. |

FOREIGN PATENT DOCUMENTS

| | | |
|---|---|---|
| CN | 111949393 A | 11/2020 |
| CN | 112003711 A | 11/2020 |
| CN | 107342978 B | 12/2020 |
| CN | 113193973 A | 7/2021 |
| CN | 113259697 A | 8/2021 |
| CN | 113630610 A | 11/2021 |
| CN | 114189702 A | 3/2022 |

OTHER PUBLICATIONS

China National Intellectual Property Administration, First office action of Chinese application No. 202111483594.2 issued on Mar. 30, 2023, which is foreign counterpart application of this US application.

China National Intellectual Property Administration, Notification to grant patent right for invention of Chinese application No. 202111483594.2 issued on Sep. 3, 2023, which is foreign counterpart application of this US application.

* cited by examiner

FIG. 1

| Acquiring synchronization data and local data corresponding to a predetermined resource object in a target live streaming room by a predetermined timing strategy, wherein the synchronization data is synchronously stored between a primary node and a secondary node on a server side, and includes a waiting queue of waiting users requesting but not occupying the predetermined resource object, the waiting queue including first user data of all of the waiting users; and the local data is stored in the primary node, and includes second user data of an invited user corresponding to the predetermined resource object | S201 |

↓

| Determining a target user based on a sequence of the waiting users in the waiting queue | S202 |

↓

| Acquiring a current state of the target user by comparing the synchronization data and the local data for the target user; and | S203 |

↓

| Determining, based on the current state, whether to send an invitation for allocating the predetermined resource object to a target user side | S204 |

METHOD AND APPARATUS FOR ALLOCATING RESOURCE OBJECTS BASED ON LIVE STREAMING ROOMS, AND DEVICE AND STORAGE MEDIUM THEREOF

CROSS-REFERENCE TO RELATED APPLICATION

This application is a U.S. national stage of international application No. PCT/CN2022/135224, filed on Nov. 30, 2022, which claims priority to Chinese Patent Application No. 202111483594.2, filed on Dec. 7, 2021, the disclosures of which are herein incorporated by references in their entireties.

TECHNICAL FIELD

Embodiments of the present disclosure relate to the technical field of live streaming, and in particular, relate to a method and apparatus for allocating resource objects based on live streaming rooms, and a device and a storage medium thereof.

BACKGROUND

A live streaming room is a virtual room in a live streaming application (App) product, and serves as a primary gathering place for users. As one of core functions of the live streaming room, the users achieve communications by terminal devices over resource objects in the live streaming room, such as microphone positions. The microphone position is construed as a position of microphone in the room.

SUMMARY

Embodiments of the present disclosure provide a method and apparatus for allocating resource objects based on live streaming rooms, and a device and a storage medium thereof.

Some embodiments of the present disclosure provide a method for allocating resource objects based on live streaming rooms. The method incudes:
  acquiring synchronization data and local data corresponding to a predetermined resource object in a target live streaming room, wherein the synchronization data is synchronously stored between the primary node and a secondary node on the server side, and includes a waiting queue of waiting users requesting but not occupying the predetermined resource object, the waiting queue including first user data of all of the waiting users, and the first user data including a first user identifier and a first enqueueing time; and the local data is stored in the primary node, and includes second user data of an invited user corresponding to the predetermined resource object, the second user data including a second user identifier, a latest inviting time, and a second enqueueing time recorded in a latest invitation;
  determining a target user based on a sequence of the waiting users in the waiting queue;
  acquiring a current state of the target user by comparing the synchronization data and the local data for the target user; and
  determining, based on the current state, whether to send an invitation for allocating the predetermined resource object to a target user side.

Some embodiments of the present disclosure provide a computer device. The computer device incudes: a memory, a processor, and one or more computer programs stored in the memory that are runnable on the processor, wherein the processor, when loading and running the one or more computer programs, is caused to perform the method for allocating resource objects based on live streaming rooms according to the embodiments of the present disclosure.

Some embodiments of the present disclosure provide a non-transitory computer-readable storage medium. The non-transitory computer-readable storage medium stores one or more computer programs, wherein the one or more computer programs, when loaded and run by a processor, cause the processor to perform the method for allocating resource objects based on live streaming rooms according to the embodiments of the present disclosure.

DETAILED DESCRIPTION

The present disclosure is described hereinafter in conjunction with the accompany drawings and the embodiments. It can be understood that the embodiments described herein are only used to explain the present disclosure. It should be further noted that the accompanying drawings only show parts related to the present disclosure for convenient description.

As the live streaming room includes a large number of users, and the resource objects are rare resources, in the live streaming room, a scenario of microphone contention (users preempt a microphone position) is common in the case that many users initiate a request to use the same resource object (microphone position). For addressment of the problem of a high failure rate of resource object requests and poor user experience due to resource contention, many states (including a resource object state, a user state, and the like) on a user end (such as user mobile terminal) and a server end (backend) need to be maintained. For example, in the case that a resource object is occupied by a user, the state of the resource object changes, such that the problem that several users request the same resource object does not occur. Meanwhile, the live streaming platform is widely used in the micro-service architecture, and the states need to be synchronized between master and secondary nodes to ensure high availability of the entire service.

In related practice, the live streaming room is generally hosted by a streamer, the streamer is a direct participant in state maintenance and synchronization, and a user cannot occupy the resource object without the streamer. In this case, the streamer side performs several tasks and needs to interact with the backend, and a state machine even needs to be introduced to maintain various states. As such, a great burden is posed on the streamer side, power consumption is great, and the entire service process may be disrupted once the streamer side is abnormal. Thus, the solution to allocating resource objects in the live streaming room in some practice still needs to be improved.

Figure 1:
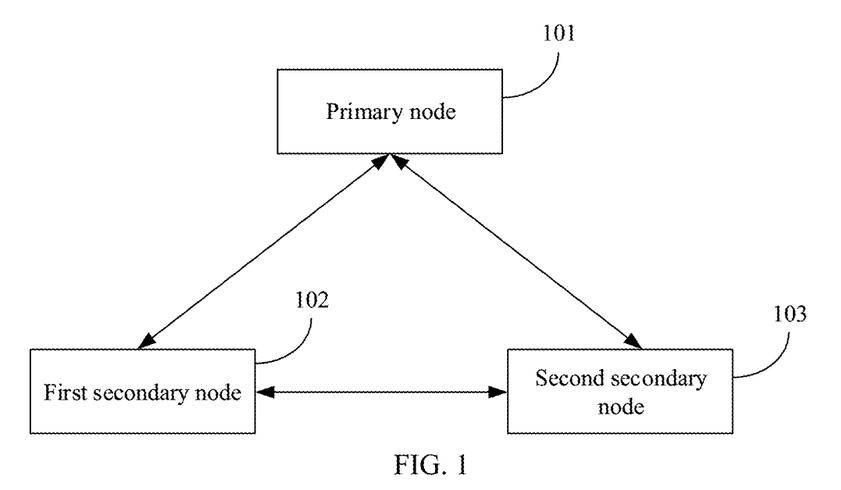
FIG. 1 is a scenario architecture of an application scenario of a method for allocating resource objects based on live streaming rooms according to some embodiments of the present disclosure.

FIG. 1 is a scenario architecture of an application scenario of a method for allocating resource objects based on live streaming rooms according to some embodiments of the present disclosure. Illustratively, referring to FIG. 1, in the application scenario, a server side corresponding to a live streaming platform includes a primary node 101, a first secondary node 102, and a second secondary node 103. It should be noted that more or less secondary nodes are disposed, and FIG. 1 is only exemplarily illustrated. A client (live streaming App) corresponding to the live streaming platform is mounted in a terminal device used by a user, and is in communication with at least one of the primary node and the secondary nodes. Synchronization data is synchronously stored between the primary node 101, the first secondary node 102, and the second secondary node 103, and local data is also stored in the primary node 101.

Figure 2:
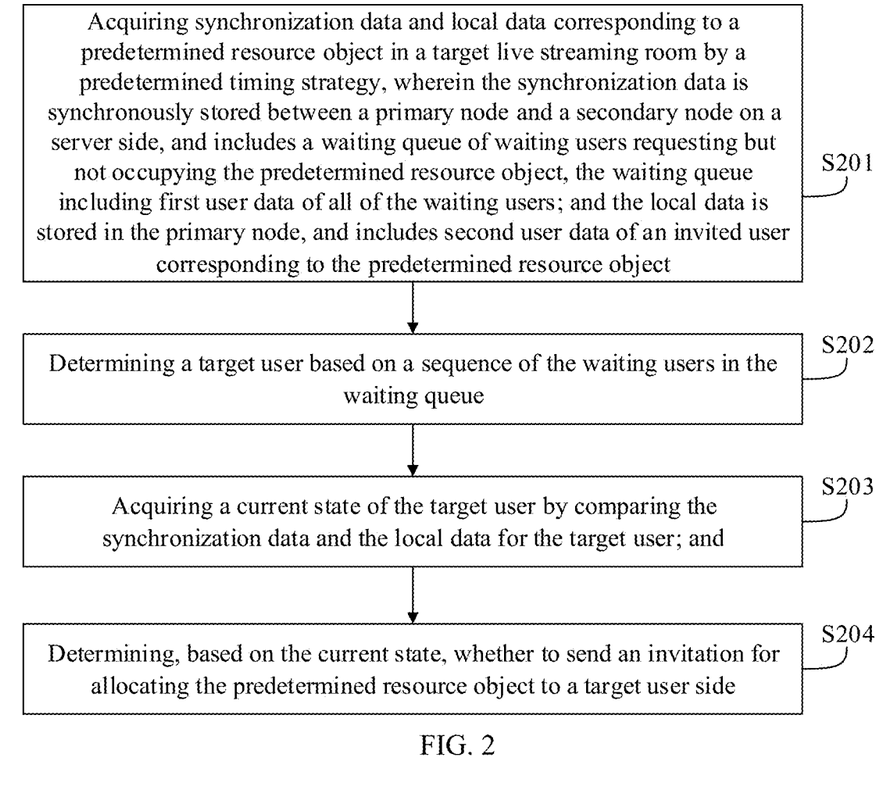
FIG. 2 is a flowchart of a method for allocating resource objects based on live streaming rooms according to some embodiments of the present disclosure.

FIG. 2 is a flowchart of a method for allocating resource objects based on live streaming rooms according to some embodiments of the present disclosure. The method is performed by an apparatus for allocating resource objects based on live streaming rooms, and the apparatus is implemented by software and/or hardware and is generally integrated in a computer device in which a server or the like is determined as the primary node. The primary node is construed as a node with a current identity being the primary node. As shown in FIG. 2, the method includes the following processes.

In S201, synchronization data and local data corresponding to a predetermined resource object in a target live streaming room are acquired by a predetermined timing strategy, wherein the synchronization data is synchronously stored between a primary node and a secondary node on a server side, and includes a waiting queue of waiting users requesting but not occupying the predetermined resource object, the waiting queue including first user data of all of the waiting users; and the local data is stored in the primary node, and includes second user data of an invited user corresponding to the predetermined resource object.

In the embodiments of the present disclosure, the target live streaming room is a live streaming room in which the predetermined resource object needs be allocated by the server side, an unattended live streaming room, or a live streaming room in a state where an allocation process does not need to be determined by a user side. For example, the target live streaming room does not have a streamer, that is, current users in the target live streaming room do not include a user playing a streamer's role. For example, the target live streaming room has a streamer, but a current setting of the target live streaming room indicates that the streamer is not permitted to allocate the predetermined resource object, or the streamer actively sets the server side to replace the streamer to automatically allocate the predetermined resource object to reduce operations of the streamer.

Illustratively, a form of the predetermined resource object is associated with a type or a supported function of the target live streaming room. For example, the target live streaming room is a target live streaming room based on voice communication, the predetermined resource object is a microphone position, the microphone position may be construed as a position of the microphone in the live streaming room, and a number of the microphone positions are set according to actual needs. For example, the target live streaming room supports a gram function, and the predetermined resource object is a qualification to participate in the game, or the like.

In the embodiments of the present disclosure, the synchronization data is construed as date synchronized stored between the primary node and the secondary node on the server side, and ensures consistency of the synchronization data stored between the primary node and the secondary node to a certain extent. The synchronization data includes the waiting queue of the waiting users requesting but not occupying the predetermined resource object, and the waiting queue includes the first user data of all of the waiting users. The waiting user is construed as a user that has requested to occupy the predetermined resource object and does not occupy the predetermined resource object currently. The first user data includes an identifier for representing the user identity, denoted as a first user identifier, and other related data, such as a requesting time or a time joining in the waiting queue (denoted as a first enqueueing time), and the like.

Illustratively, in the case that a first user in the target live streaming room tends to occupy the predetermined resource object, the first user sends a request through the used live streaming APP to request to join in the waiting queue, and the node receiving the request adds the first user to the waiting queue, generally a queue end of the waiting queue. For example, the first user data of the first user is added in the waiting queue in a data storage sequence. Subsequently, the first user data of the first user is synchronized to other nodes of the server side to ensure consistence of the synchronization data in the nodes. In the case that the current primary node is abnormal, and the primary node and the secondary node are switched, the waiting queue is not missing.

Illustratively, in the case that a second user in the target live streaming room is in the waiting queue, and the second user leaves the room, the second user cancels the waiting (such as triggering a control for cancelling the request on an interface of the live streaming APP, or rejecting an invitation for allocating the resource object from the primary node, and the like), or the second user has succeeded in occupying the predetermined resource object, the second user is cancelled from the waiting queue, and a change of the waiting queue due to the cancel operation is synchronized to other nodes of the server side to ensure consistence of the synchronization data in the nodes.

In the embodiments of the present disclosure, the local data is construed as date stored in the local of the primary node, for example, stored in a memory of the primary node. The local data includes second user data of an invited user corresponding to the predetermined resource object. The invited user is construed as a user to which the primary node has sent an invitation for allocating the predetermined resource object. The second user data includes an identifier for representing the user identity, denoted as a second user identifier for distinguishing from the first user data. It should be noted that the user identifier is globally unique on the server side, and the first user identifier and the second user identifier of the same user are consistent. The second user data also includes other related data, for example, an invited time (such as a latest inviting time), an invited number, a time joining in the waiting queue and recorded in the invitation (a second enqueueing time recorded in a latest invitation), and the like.

Illustratively, the primary node stores the second user data corresponding to a third user in the local upon sending an invitation for allocating the predetermined resource object to the third user in the target live streaming room. The data is not synchronized between the primary node and the secondary node. Even in the case that the primary node is abnormal, the primary node and the secondary node are switched, and a same user is repeatedly invited in an extreme case, a less effect is caused by the case, and the repeated invitation received on the user side is processed to eliminate the effect. For example, in the case that two invitations are continuously received, a new invitation is ignored.

In the embodiments of the present disclosure, the waiting queue is synchronized between the primary node and the secondary node, and the local data is not synchronized, such that the synchronization data is not expanded, the synchronization time is not increased, the backend burden is reduced, and the automatic allocation of the predetermined resource object is achieved by comparing the synchronization data and the local data.

Illustratively, the synchronization data and the local data are acquired in response to trigger of an allocation event of the predetermined resource object. In some embodiments, the allocation event of the predetermined resource object is triggered by the predetermined timing strategy. The predetermined timing strategy is set by a timer, for example, acquiring at each predetermined interval. The predetermined interval is set according to actual needs, for example, 5 seconds.

In some embodiments, a number of the predetermined resource objects in the target live streaming room is limited. The timer is started in the case that an idle predetermined resource object is present, or whether the idle predetermined resource object is present is determined in response to trigger of the timer.

In S202, a target user is determined based on a sequence of the waiting users in the waiting queue.

Illustratively, a user first entering the waiting queue is in a head position of the queue. In this case, the user at the head of the queue currently is determined as the target user, that is, a waiting user corresponding to the first user data in the head of the waiting queue is determined as the target user.

In S203, a current state of the target user is acquired by comparing the synchronization data and the local data for the target user.

Illustratively, the current state of the target user includes an enqueued but not invited state (that is, the target user joins in the waiting queue, and the invitation is not sent to the target user), an invited state (that is, the invitation is sent to the target user, and the target user currently fails to occupy the predetermined resource object), and the like.

Illustratively, in the case that the first user data includes the first user identifier, and the second user data includes the second user identifier, whether the local data includes the second user identifier coincident with the first user identifier of the target user is determined for the target user. The current state is the invited state in the case that the local data includes the second user identifier coincident with the first user identifier of the target user, and the current state is the enqueued but not invited state in the case that the local data does not include the second user identifier coincident with the first user identifier of the target user.

Illustratively, in the case that the first user data and the second user data include richer user-related information, the current state is defined more detailed, such that the current state of the target user is determined more accurately, for example, an expired invitation state, a requeued but not invited state, and the like.

In S204, whether to send an invitation for allocating the predetermined resource object to the target user is determined based on the current state.

Illustratively, in the case that the current state is the enqueued but not invited state, the invitation for allocating the predetermined resource object is sent to the target user; in the case that the current state is the invited state, the invitation for allocating the predetermined resource object is inhibited sending to the target user, such that the repeated invitation is avoided, and unnecessary interaction is reduced.

In the method for allocating resource objects based on live streaming rooms according to the embodiments of the present disclosure, by the above technical solution, reasonable allocation of the resource objects in the live streaming room is automatically achieved on the server side without manual allocation by the streamer, and the streamer side terminal does not need to maintain excessive state data related to the resource objects and does not perform excessive interaction operations with the server side due to the resource object allocation, such that the burden on the streamer side terminal is reduced, the allocation efficiency is improved, and the utilization rate of the resource objects in the live streaming room and the activity of the live streaming room are improved. In addition, a data aggregation layer specific for data synchronization and other assemblies are not required in the technical solution, such that the backend burden is not increased, and the high performance of the server side is ensured.

In some embodiments, upon sending the invitation for allocating the predetermined resource object to the target user side, the method further includes: sending a determining request to the target user side in response receiving invitation information from the target user side, processing a protocol request in response to receiving a request based on a predetermined resource object occupation protocol (for example, a microphone position joining protocol) and initiated by the target user side for the determining request, and returning a protocol request processing result on the target user side to finish all processes of occupying the predetermined resource object.

Figure 3:
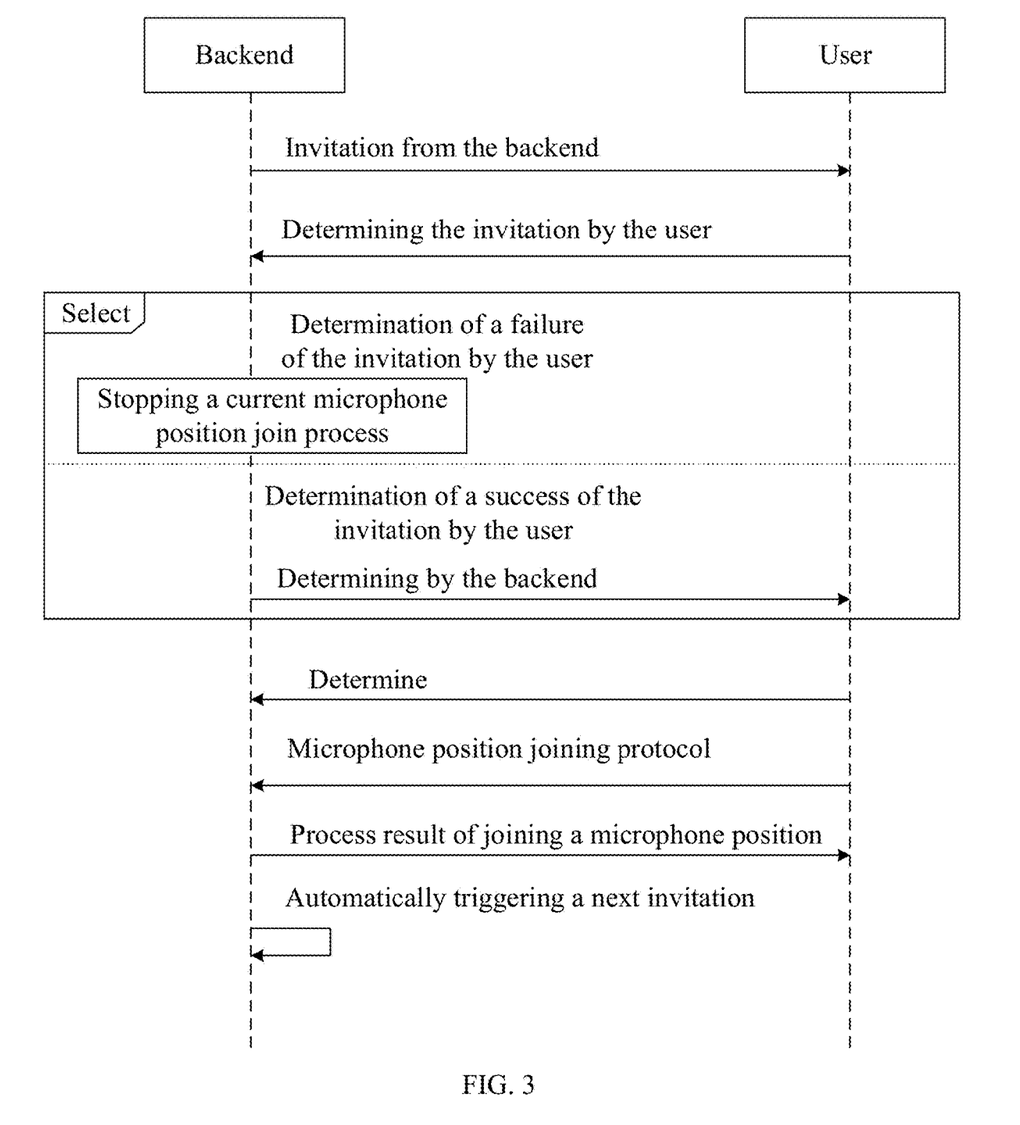
FIG. 3 is a flowchart of joining a microphone position according to some embodiments of the present disclosure.

Illustratively, FIG. 3 is a flowchart of joining a microphone position according to some embodiments of the present disclosure. By taking the predetermined resource object being the microphone position as an example, joining the microphone position is construed as an operation of occupying a microphone position in the live streaming room of a user. The backend (the server side) sends a microphone position join invitation to the user, and the user (the user side) determines the invitation. In the case that the user determines a failure of the invitation, the processes are stopped. In the case that the user determines a success of the invitation, the backend continues to determine for the user. In the case that the user determines and initiates the microphone position join protocol, the backend processes the microphone position join processes and returns the processing result, and then the backend automatically triggers a next invitation process.

In some embodiments, the server side according to the embodiments of the present disclosure is a micro-service architecture, and a service for initiating an initiation for allocating the predetermined resource object and a service for processing the processes of occupying the predetermined resource object are the same service or different services.

In some embodiments, the current state includes the enqueued but not invited state. Acquiring the current state of the target user by comparing the synchronization data and the local data for the target user includes: determining, in response to not acquiring the coincident second user identifier from the local data based on the target first user identifier corresponding to the target user in the synchronization data, that the current state of the target user is an enqueued but not invited state. Determining, based on the current state, whether to send the invitation for allocating the predetermined resource object to the target user side includes: sending the invitation for allocating the predetermined resource object to the target user side in response to determining that the current state of the target user is the enqueued but not invited state. It can be understood that whether the target user is invited is quickly determined by comparing the user identifiers, and the invitation is quickly sent to the target user in response to the user being not invited, such that the utilization of the predetermined resource object is improved.

In some embodiments, the current state includes the invited state. Acquiring the current state of the target user by comparing the synchronization data and the local data for the target user includes: determining that the current state of the target user is the invited state in response to acquiring the coincident second user identifier from the local data based on the target first user identifier corresponding to the target user in the synchronization data, a difference between a current time and a latest inviting time corresponding to a searched second user identifier being within a predetermined duration range, and the second enqueueing time corresponding to the searched second user identifier being coincident with the first enqueueing time corresponding to the target first user identifier. Determining, based on the current state, whether to send the invitation for allocating the predetermined resource object to the target user side includes: inhibiting sending the invitation for allocating the predetermined resource object to the target user side in response to determining that the current state of the target user is the invited state. It can be understood that whether the target user is in a process of occupying the predetermined resource object is determined more accurately. As described above, upon sending of the invitation to the target user side, the predetermined resource object is successfully occupied by complex interaction processes, such as one more determination processes. In the processes, a duration of the process is not determined due to unstable network state and other factors, and the process of successfully occupying the predetermined resource object by the target user is avoided to be waited for a long time by defining a predetermined duration range, such that the utilization of the predetermined resource object is improved.

Illustratively, acquiring the second user identifier of the target user in the local data means that the invitation is sent to the target user. The difference between a current time and a previous invitation time being not beyond the predetermined duration range means that the target user is in a normal processing process. The enqueueing time of the target user being not changed means that the target user is in a waiting process, the previous invitation is valid, and the invitation is not required again.

In some embodiments, the current state includes the requeued but not invited state. Acquiring the current state of the target user by comparing the synchronization data and the local data for the target user includes: determining that the current state of the target user is the requeued but not invited state in response to acquiring the coincident second user identifier from the local data based on the target first user identifier corresponding to the target user in the synchronization data, a difference between a current time and a latest inviting time corresponding to a searched second user identifier being within a predetermined duration range, and the second enqueueing time corresponding to the searched second user identifier being not coincident with the first enqueueing time corresponding to the target first user identifier. Determining, based on the current state, whether to send the invitation for allocating the predetermined resource object to the target user side includes: sending the invitation for allocating the predetermined resource object to the target user side in response to determining that the current state of the target user is the requeued but not invited state. It can be understood that a case that the target user rejoins in the waiting queue within a short duration is accurately determined, such that a missed invitation due to an error determination of the current state being the invited state is avoided.

Illustratively, within a range of a time interval between each two time that the primary node acquires the synchronization data and the local data, the first enqueueing time is dynamically and synchronously updated in the primary node and the primary node, and the second enqueueing time is an enqueueing time recorded in that case that the user is invited. In the case that the user requeues the waiting queue upon being invited, the first enqueueing time is changed, and the second enqueueing time is unchanged. By comparing the first enqueueing time to the second enqueueing time, whether the user is waiting for the process of occupying the predetermined resource object or exits the waiting queue and rejoins within the range of the time interval is determined. In the case that the user requeues, the pervious invitation is invalid, and the invitation required to be sent to the user again.

In some embodiments, the current state includes the expired invitation state. Acquiring the current state of the target user by comparing the synchronization data and the local data for the target user includes: determining, in response to acquiring the coincident second user identifier from the local data based on the target first user identifier corresponding to the target user in the synchronization data, a difference between a current time and a latest inviting time corresponding to a searched second user identifier being beyond a predetermined duration range, whether the second enqueueing time corresponding to the searched second user identifier is coincident with the first enqueueing time corresponding to the target first user identifier; and determining, in response to the second enqueueing time corresponding to the searched second user identifier being coincident with the first enqueueing time corresponding to the target first user identifier, that the current state of the target user is the expired invitation state. Determining, based on the current state, whether to send the invitation for allocating the predetermined resource object to the target user side includes: in response to determining that the current state of the target user is the expired invitation state, inhibiting sending the invitation for allocating the predetermined resource object to the target user side, and cancelling the first user data corresponding to the target user from the waiting queue. It can be understood that the user invited but not successfully occupying the predetermined resource object for a long time is accurately determined, an opportunity is provided for other users to avoid the waste of idle predetermined resource object.

Illustratively, acquiring the second user identifier of the target user from the local data means that the invitation is sent to the target user. The difference between a current time and a previous invitation time being beyond the predetermined duration range means that the target user is likely in a poor network condition and unable to occupy the predetermined resource object. The enqueueing time recorded in the latest invitation being coincident with the latest enqueueing time means that the target user is in the waiting process and is not requeued. Thus, the invitation is inhibited sending, and the target user is cancelled from the waiting queue to avoid being determined as the target user again.

In some embodiments, upon determining whether the second enqueueing time corresponding to the searched second user identifier is coincident with the first enqueueing time corresponding to the target first user identifier, the method further includes: determining, in response to the second enqueueing time corresponding to the searched second user identifier being not coincident with the first enqueueing time corresponding to the target first user identifier, that the current state of the target user is a requeued but not invited state. Determining, based on the current state, whether to send the invitation for allocating the predetermined resource object to the target user side includes: sending the invitation for allocating the predetermined resource object to the target user side in response to determining that the current state of the target user is the requeued but not invited state. It can be understood that although the target user does not successfully occupy the predetermined resource object for a long time, the network abnormal case is solved as the target user requeues. The process is difficult to be detected by the target user, a more intuitive experience is that the target user has waited for a long time upon determination of occupation of the predetermined resource object, and thus the opportunity to try again is provided to the target user and an invitation is sent to the target user again to avoid the confusion of the target user.

In some embodiments, sending the invitation for allocating the predetermined resource object to the target user side in response to determining that the current state of the target user is the requeued but not invited state includes: sending the invitation for allocating the predetermined resource object to the target user side in response to determining that the current state of the target user is the requeued but not invited state and a determining result that the coincident first user identifier is not searched from the local data based on the target second user identifier in the local data. It can be understood that a user corresponding to the target second user identifier in the local data is a latest invited user (denoted as a fourth user). The fourth user being not in the waiting queue means that the fourth user has successfully occupied the predetermined resource object or has left, and the invitation is sent to the target user in this case. The fourth user being in the waiting queue means that the fourth user re-requests to queue within a short time subsequent to leaving the queue, in this case, the previous invitation qualification of the fourth user is reserved, other target users are not invited temporarily, and the fourth user is redetermined as the target user at a next timer trigger time.

In some embodiments, sending the invitation for allocating the predetermined resource object to the target user side in response to determining that the current state of the target user is the requeued but not invited state includes: sending the invitation for allocating the predetermined resource object to the target user side in response to determining that the current state of the target user is the requeued but not invited state, the coincident first user identifier being searched from the local data based on the target second user identifier in the local data, and the first enqueueing time corresponding to the searched first user identifier being not coincident with the second enqueueing time corresponding to the target second user identifier. It can be understood that in the case that the above fourth user is still in the waiting queue, whether an enqueueing time of the fourth user is changed is determined. In the case that the enqueueing time of the fourth user is changed, the fourth user is requeued, and the invitation is sent to the target user. In the case that the enqueueing time of the fourth user is not changed, the determination of the target user is abnormal, or the fourth user is re-placed in the waiting queue (for example, the head) as the fourth user does not successfully occupy the predetermined resource object upon false dequeuing from the waiting queue. In this case, other target users are not invited temporarily, and the fourth user is redetermined as the target user at a next timer trigger time.

Figure 4:
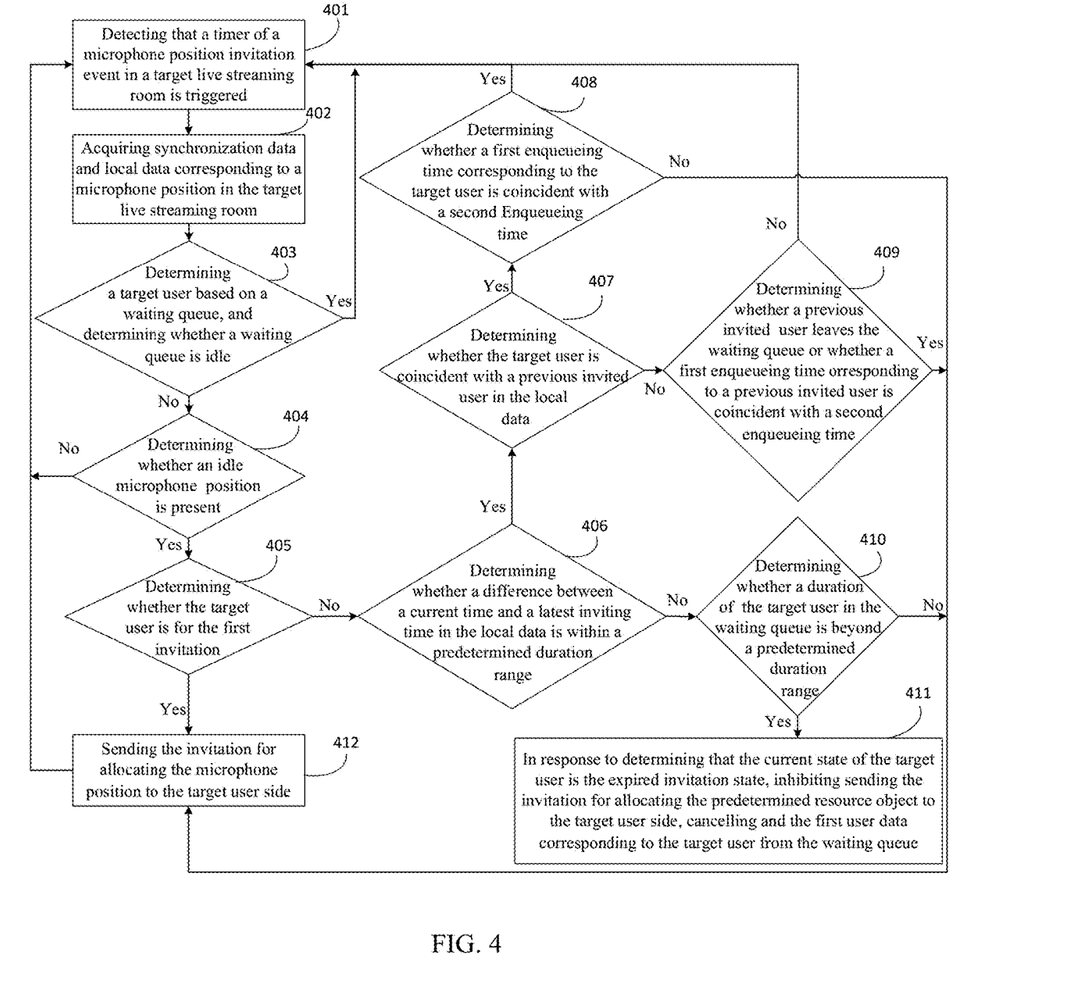
FIG. 4 is a flowchart of a method for allocating resource objects based on live streaming rooms according to some embodiments of the present disclosure.

FIG. 4 is a flowchart of a method for allocating resource objects based on live streaming rooms according to some embodiments of the present disclosure. The embodiments are modified based on the above embodiments. The predetermined resource object is an exemplary microphone position for convenient description. The method includes the following processes.

In S401, a timer of a microphone position invitation event in a target live streaming room is detected to be triggered.

Illustratively, the timer is configured according to actual service needs, for example, the timer is triggered each five seconds. The primary node determines the state of the user by continuously scanning the waiting queue in the synchronization data by the timer and comparing the synchronization data and the local data.

In S402, synchronization data and local data corresponding to a microphone position in the target live streaming room are acquired.

The synchronization data is synchronously stored between the primary node and a secondary node on the server side, and includes a waiting queue of waiting users requesting but not occupying the microphone position. The waiting queue includes first user data of all of the waiting users, and the first user data includes a first user identifier and a first enqueueing time. The local data is stored in the primary node, and includes second user data of an invited user corresponding to the microphone position. The second user data includes a second user identifier, a latest inviting time, and a second enqueueing time recorded in a latest invitation.

In S403, whether a waiting queue is idle is determined, a target user is determined based on the waiting queue in response to a determination result that the waiting queue is not idle, and S404 is performed; S401 is performed in response to a determination result that the waiting queue is idle.

Illustratively, in the case that the waiting queue is idle, the target user is not determined, and thus the process is failed. In the case that the waiting queue is not idle, the target user is determined based on the sequence of the waiting users in the waiting queue, for example, the user corresponding to the first user data in the head of the queue is determined as the target user.

Illustratively, assuming that a user A, a user B, and a user C sequentially send a microphone position join request, and thus the waiting queue includes first user identifiers a, b, and c and first enqueueing times Ta1, Tb1, and Tc1 corresponding to the user A, the user B, and the user C. The user A is in the head, and thus the current target user is the user A.

In S404, whether an idle microphone position is present is determined, S405 is performed in the case that the idle microphone position is present, and S401 is performed in the case that the idle microphone position is not present.

In S405, whether the target user is for the first invitation is determined, S412 is performed in the case that the target user is invited for the first time, and S401 is performed in the case that the target user is not invited for the first time.

Illustratively, the first invitation is described relative to the target live streaming room. For example, in the case that the target live streaming room is created or is started in this time, a first invitation for a user of joining the microphone position is construed as the first invitation.

Illustratively, it is assumed that in starting the microphone position join invitation, for example, the user A is a first target user, and the user A is for the first invitation, and S412 is directly performed. The microphone position join invitation is sent to the user A, and the local data is updated. That is, a second user identifier a, a latest inviting time Ta, and a second enqueueing time Ta2 recorded in a latest invitation corresponding to the user A are stored in the memory of the primary node.

In S406, whether a difference between a current time and a latest inviting time in the local data is within a predetermined duration range is determined, S407 is performed in the case that the difference is within the predetermined duration range, and S410 is performed in the case that the difference is beyond the predetermined duration range.

Illustratively, in the case that the local data includes several sets of second user data, a latest inviting time closest to the current time is used to calculate the difference.

Illustratively, assuming that the predetermined duration range is a range less than or equal to 20 seconds, and thus whether the current time is beyond 20 seconds from the latest sending of the microphone position join invitation is determined.

In S407, whether the target user is coincident with a previous invited user in the local data is determined, S408 is performed in the case that the target user is coincident with the previous invited user in the local data, and S409 is performed in the case that the target user is not coincident with the previous invited user in the local data.

Illustratively, whether the coincident second user identifier is searched from the local data based on the target first user identifier corresponding to the target user in the synchronization data is determined, the invitation is sent to the target user in the case that the coincident second user identifier is present, S408 is performed, and the subsequent determination is performed. In the case that the coincident second user identifier is not present, the target user is a new to-be-invited user.

In S408, whether a first enqueueing time corresponding to the target user is coincident with a second enqueueing time is determined, S401 is performed in the case that the first enqueueing time corresponding to the target user is coincident with the second enqueueing time, and S412 is performed in the case that the first enqueueing time corresponding to the target user is not coincident with the second enqueueing time.

In S409, whether a previous invited user leaves the waiting queue or whether a first enqueueing time corresponding to a previous invited user is coincident with a second enqueueing time is determined, S412 is performed in the case that the previous invited user leaves the waiting queue or the first enqueueing time corresponding to the previous invited user is coincident with the second enqueueing time, and S401 is performed in the case that the previous invited user does not leave the waiting queue or the first enqueueing time corresponding to the previous invited user is not coincident with the second enqueueing time.

In S410, whether a duration of the target user in the waiting queue is beyond a predetermined duration range is determined, S411 is performed in the case that the duration of the target user in the waiting queue is beyond the predetermined duration range, and S412 is performed in the case that the duration of the target user in the waiting queue is not beyond the predetermined duration range.

In S411, in response to determining that the current state of the target user is the expired invitation state, the invitation for allocating the predetermined resource object is inhibited sending to the target user side, and the first user data corresponding to the target user is cancelled from the waiting queue.

In S412, the invitation for allocating the microphone position is sent to the target user side.

It should be noted that the execution sequence of the above processes is adjustable according to actual needs, for example, S403 is performed subsequent to S404. That is, whether an idle microphone position is present is first determined, and then the target user is determined in the case that the idle microphone position is present.

Illustratively, referring to the above processes, the user A is determined as a first invited user, and a first user data of the user A is cancelled from the waiting queue in the case that the user A is successful in joining the microphone position. In some embodiments, upon sending of the microphone position join invitation to the user A, the first user data of the user A is still in the waiting queue in a next timer trigger time, that is, upon five seconds, and the user A is still determined as the target user. The current state of the user A is still determined, and whether to send the microphone position join invitation to the user A is determined. In this case, the local data includes the second user data corresponding to the user A, a difference between the current time and the Ta is calculated (for example, about five seconds), and whether Ta1 is coincident with Ta2 is further determined in the case that the difference is with the predetermined duration range and the user A is coincident with the previous invited user. The Ta1 being coincident with Ta2 means that the user A does not leave the waiting queue, and thus a next timer trigger is waited and the invitation is not sent to the user A. The Ta1 being not coincident with Ta2 means that the user A has left the waiting queue and requeues the waiting queue (for example, the user A is offline and re-requests to join the microphone position upon being online, the user B and the user C have left before re-requesting to join the microphone position of the user A, and thus the user A is determined as the current target user) within two trigger intervals of the timer, and thus the invitation is sent to the user A again. In the case that the user A fails to join the microphone position for a long time, the user A is in the waiting queue, and the difference between the current time and the Ta may be greater than 20 seconds upon several triggers of the timer. In this case, whether the duration of the user A in the waiting queue is greater than 20 seconds is determined. In the case that the duration of the user A in the waiting queue is greater than 20 seconds, the invitation is expired, the user A is cancelled from the waiting queue, and an opportunity of joining the microphone position is provided for subsequent users. In the case that the duration of the user A in the waiting queue is less than 20 seconds, a case that the user A rejoins the waiting queue is present, and the invitation is sent to the user A again.

Illustratively, assuming that the determined target user is the user B upon trigger of the timer, and it is not the first invitation, and thus whether the current time is beyond 20 seconds from the previous invitation time is determined. The user B and the previous invited user A are determined to be different in the case that the current time is not beyond 20 seconds from the previous invitation time. In this case, whether the user A has left the waiting queue is determined. The invitation is sent to the user B in the case that the user A has left the waiting queue. Whether Ta1 of the user A is coincident with Ta2 is further determined in the case that the user A is still in the waiting queue. The user A is determined to rejoin the waiting queue in the case that Ta1 of the user A is not coincident with Ta2, and the invitation is sent to the user B. In the case that Ta1 of the user A is coincident with Ta2, the invitation is not sent to the user B, and a target user is redetermined in the next timer trigger time.

In the method for allocating resource objects based on live streaming rooms according to the embodiments of the present disclosure, the user requests to get the microphone by requesting to join the waiting queue, and the microphone position join is achieved by the primary node on the service. That is, the user waits for the microphone position join and achieves the microphone position join upon joining the waiting queue, and mutual intervention is not required in the processes, such that the burden of the streamer side is reduced. The method is applicable to a service scenario of the unattended live streaming room including the non-streamer room. The server side is the micro-service architecture. In the above technical solutions, the data aggregation layer and other assemblies are not required, a large number of state change and data synchronization problems are solved only depending on the memory of the micro-service architecture backed and limited synchronization mechanism, such that the expansion of synchronization data in the primary node and the secondary node is avoided, the burden of the backend is not increased, and the high performance of the server side is ensured. Meanwhile, the backend undertakes all state maintenance and synchronization, such that the service processes undertaken by the mobile end are fewer, the App is lighter. Thus, the mobile end participates in more complex services, and the performance of the entire live streaming system is improved.

Figure 5:
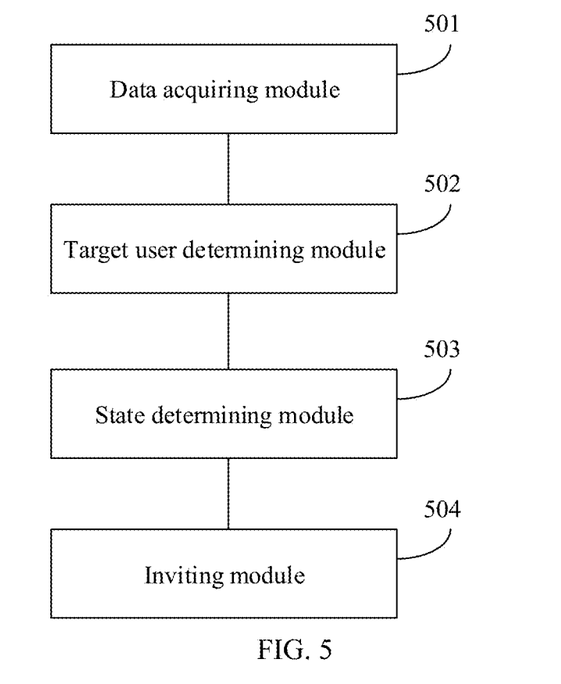
FIG. 5 is a block diagram of an apparatus for allocating resource objects based on live streaming rooms according to some embodiments of the present disclosure.

FIG. 5 is a block diagram of an apparatus for allocating resource objects based on live streaming rooms according to some embodiments of the present disclosure. The apparatus is configured in the primary node of the server side, is implemented by software and/or hardware, and is generally integrated in a computer device. The apparatus allocates the resource object by performing the method for allocating resource objects based on live streaming rooms. As shown in FIG. 5, the apparatus includes:

- a data acquiring module 501, configured to acquire synchronization data and local data corresponding to a predetermined resource object in a target live streaming room, wherein the synchronization data is synchronously stored between the primary node and a secondary node on the server side, and includes a waiting queue of waiting users requesting but not occupying the predetermined resource object, the waiting queue including first user data of all of the waiting users; and the local data is stored in the primary node, and includes second user data of an invited user corresponding to the predetermined resource object;
- a target user determining module 502, configured to determine a target user based on a sequence of the waiting users in the waiting queue;
- a state determining module 503, configured to acquire a current state of the target user by comparing the synchronization data and the local data for the target user; and
- an inviting module 504, configured to determine, based on the current state, whether to send an invitation for allocating the predetermined resource object to a target user side.

Figure 6:
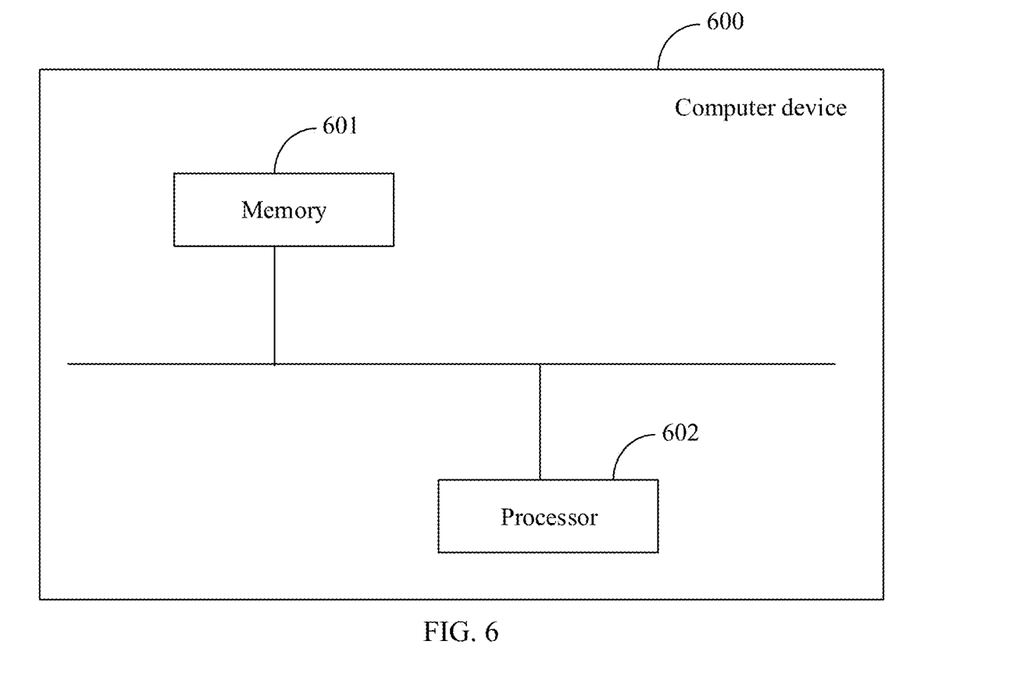
FIG. 6 is a block diagram of a computer device according to some embodiments of the present disclosure.

Embodiments of the present disclosure provide a computer device. The computer device is integrated in the apparatus for allocating resource objects based on live streaming rooms according to the embodiments of the present disclosure. FIG. 6 is a block diagram of a computer device according to some embodiments of the present disclosure. The computer device 600 includes a memory 601, a processor 602, and one or more computer programs stored in the memory 601 that are runnable on the processor 602. The processor 602, when loading and running the one or more computer programs, is caused to perform the method for allocating resource objects based on live streaming rooms according to the embodiments of the present disclosure.

Embodiments of the present disclosure further provide a non-transitory computer-readable storage medium including computer-executable instructions. The computer-executable instructions, when loaded and run by a processor of a computer, cause the processor of the computer to perform the method for allocating resource objects based on live streaming rooms according to the embodiments of the present disclosure.

The apparatus for allocating resource objects based on live streaming rooms, and the device and the storage medium thereof in the above embodiments perform the method for allocating resource objects based on live streaming rooms according to any embodiment of the present disclosure, and particularly perform functional modules and technical effects of the method. For technical details not detailed in the above embodiments, reference may be made to the method for allocating resource objects based on live streaming rooms according to any embodiment of the present disclosure.

The invention claimed is:

1. A method for allocating resource objects based on live streaming rooms, applicable to a primary node on a server side, the method comprising:

acquiring synchronization data and local data corresponding to a predetermined resource object in a target live streaming room, wherein the synchronization data is synchronously stored between the primary node and a secondary node on the server side, and comprises a waiting queue of waiting users requesting but not occupying the predetermined resource object, the waiting queue comprising first user data of all of the waiting users, and the first user data comprising a first user identifier and a first enqueueing time; and the local data is stored in the primary node, and comprises second user data of an invited user corresponding to the predetermined resource object, the second user data comprising a second user identifier, a latest inviting time, and a second enqueueing time recorded in a latest invitation;

determining a target user based on a sequence of the waiting users in the waiting queue;

acquiring a current state of the target user by comparing the synchronization data and the local data for the target user; and determining, based on the current state, whether to send an invitation for allocating the predetermined resource object to a target user side.

2. The method according to claim 1, wherein
acquiring the current state of the target user by comparing the synchronization data and the local data for the target user comprises:
determining, based on a target first user identifier corresponding to the target user in the synchronization data, whether the local data comprises the second user identifier coincident with the target first user identifier; and
in response to a determination result that the local data does not comprise the second user identifier coincident with the target first user identifier, determining that the current state of the target user is an enqueued but not invited state; and
determining, based on the current state, whether to send the invitation for allocating the predetermined resource object to the target user side comprises:
sending the invitation for allocating the predetermined resource object to the target user side in response to determining that the current state of the target user is the enqueued but not invited state.

3. The method according to claim 1, wherein
acquiring the current state of the target user by comparing the synchronization data and the local data for the target user comprises:
determining, based on a target first user identifier corresponding to the target user in the synchronization data, whether the local data comprises the second user identifier coincident with the target first user identifier;
in response to a determination result that the local data comprises the second user identifier coincident with the target first user identifier and a difference between a current time and a latest inviting time corresponding to a searched second user identifier being within a predetermined duration range, determining whether the second enqueueing time corresponding to the searched second user identifier is coincident with the first enqueueing time corresponding to the target first user identifier; and
in response to a determination result that the second enqueueing time corresponding to the searched second user identifier is coincident with the first enqueueing time corresponding to the target first user identifier, determining that the current state of the target user is an invited state; and
determining, based on the current state, whether to send the invitation for allocating the predetermined resource object to the target user side comprises:
inhibiting sending the invitation for allocating the predetermined resource object to the target user side in response to determining that the current state of the target user is the invited state.

4. The method according to claim 1, wherein
acquiring the current state of the target user by comparing the synchronization data and the local data for the target user comprises:
determining, based on a target first user identifier corresponding to the target user in the synchronization data, whether the local data comprises the second user identifier coincident with the target first user identifier;
in response to a determination result that the local data comprises the second user identifier coincident with the target first user identifier and a difference between a current time and a latest inviting time corresponding to a searched second user identifier being within a predetermined duration range, determining whether the second enqueueing time corresponding to the searched second user identifier is coincident with the first enqueueing time corresponding to the target first user identifier; and
in response to a determination result that the second enqueueing time corresponding to the searched second user identifier is not coincident with the first enqueueing time corresponding to the target first user identifier, determining that the current state of the target user is a requeued but not invited state; and
determining, based on the current state, whether to send the invitation for allocating the predetermined resource object to the target user side comprises:
sending the invitation for allocating the predetermined resource object to the target user side in response to determining that the current state of the target user is the requeued but not invited state.

5. The method according to claim 1, wherein
acquiring the current state of the target user by comparing the synchronization data and the local data for the target user comprises:
determining, based on a target first user identifier corresponding to the target user in the synchronization data, whether the local data comprises the second user identifier coincident with the target first user identifier;
in response to a determination result that the local data comprises the second user identifier coincident with the target first user identifier and a difference between a current time and a latest inviting time corresponding to a searched second user identifier being beyond a predetermined duration range, determining whether the second enqueueing time corresponding to the searched second user identifier is coincident with the first enqueueing time corresponding to the target first user identifier; and
determining, in response to a determination result that the second enqueueing time corresponding to the searched second user identifier is coincident with the first enqueueing time corresponding to the target first user identifier, that the current state of the target user is an expired invitation state; and
determining, based on the current state, whether to send the invitation for allocating the predetermined resource object to the target user side comprises:
in response to determining that the current state of the target user is the expired invitation state, inhibiting sending the invitation for allocating the predetermined resource object to the target user side, and cancelling the first user data corresponding to the target user from the waiting queue.

6. The method according to claim 5, wherein
upon determining whether the second enqueueing time corresponding to the searched second user identifier is coincident with the first enqueueing time corresponding to the target first user identifier, the method further comprises:
in response to a determination result that the second enqueueing time corresponding to the searched second user identifier is not coincident with the first enqueueing time corresponding to the target first user identifier, determining that the current state of the target user is a requeued but not invited state; and
determining, based on the current state, whether to send the invitation for allocating the predetermined resource object to the target user side comprises:

sending the invitation for allocating the predetermined resource object to the target user side in response to determining that the current state of the target user is the requeued but not invited state.

7. A computer device for allocating resource objects based on live streaming rooms, comprising: a memory, a processor, and one or more computer programs stored in the memory that are runnable on the processor, wherein the processor, when loading and running the one or more computer programs, is caused to:

acquire synchronization data and local data corresponding to a predetermined resource object in a target live streaming room, wherein the synchronization data is synchronously stored between the primary node and a secondary node on the server side, and comprises a waiting queue of waiting users requesting but not occupying the predetermined resource object, the waiting queue comprising first user data of all of the waiting users, and the first user data comprising a first user identifier and a first enqueueing time; and the local data is stored in the primary node, and comprises second user data of an invited user corresponding to the predetermined resource object, the second user data comprising a second user identifier, a latest inviting time, and a second enqueueing time recorded in a latest invitation;

determine a target user based on a sequence of the waiting users in the waiting queue;

acquire a current state of the target user by comparing the synchronization data and the local data for the target user; and determine, based on the current state, whether to send an invitation for allocating the predetermined resource object to a target user side.

8. A non-transitory computer-readable storage medium, storing one or more computer programs, wherein the one or more computer programs, when loaded and run by a processor, cause the processor to:

acquire synchronization data and local data corresponding to a predetermined resource object in a target live streaming room, wherein the synchronization data is synchronously stored between the primary node and a secondary node on the server side, and comprises a waiting queue of waiting users requesting but not occupying the predetermined resource object, the waiting queue comprising first user data of all of the waiting users, and the first user data comprising a first user identifier and a first enqueueing time; and the local data is stored in the primary node, and comprises second user data of an invited user corresponding to the predetermined resource object, the second user data comprising a second user identifier, a latest inviting time, and a second enqueueing time recorded in a latest invitation;

determine a target user based on a sequence of the waiting users in the waiting queue;

acquire a current state of the target user by comparing the synchronization data and the local data for the target user; and determine, based on the current state, whether to send an invitation for allocating the predetermined resource object to a target user side.

9. The computer device according to claim 7, wherein the processor, when loading and running the one or more computer programs, is caused to:

determine, based on a target first user identifier corresponding to the target user in the synchronization data, whether the local data comprises the second user identifier coincident with the target first user identifier;

in response to a determination result that the local data does not comprise the second user identifier coincident with the target first user identifier, determine that the current state of the target user is an enqueued but not invited state; and send the invitation for allocating the predetermined resource object to the target user side in response to determining that the current state of the target user is the enqueued but not invited state.

10. The computer device according to claim 7, wherein the processor, when loading and running the one or more computer programs, is caused to:

determine, based on a target first user identifier corresponding to the target user in the synchronization data, whether the local data comprises the second user identifier coincident with the target first user identifier;

in response to a determination result that the local data comprises the second user identifier coincident with the target first user identifier and a difference between a current time and a latest inviting time corresponding to a searched second user identifier being within a predetermined duration range, determine whether the second enqueueing time corresponding to the searched second user identifier is coincident with the first enqueueing time corresponding to the target first user identifier;

in response to a determination result that the second enqueueing time corresponding to the searched second user identifier is coincident with the first enqueueing time corresponding to the target first user identifier, determine that the current state of the target user is an invited state; and inhibit sending the invitation for allocating the predetermined resource object to the target user side in response to determining that the current state of the target user is the invited state.

11. The computer device according to claim 7, wherein the processor, when loading and running the one or more computer programs, is caused to:

determine, based on a target first user identifier corresponding to the target user in the synchronization data, whether the local data comprises the second user identifier coincident with the target first user identifier;

in response to a determination result that the local data comprises the second user identifier coincident with the target first user identifier and a difference between a current time and a latest inviting time corresponding to a searched second user identifier being within a predetermined duration range, determine whether the second enqueueing time corresponding to the searched second user identifier is coincident with the first enqueueing time corresponding to the target first user identifier;

in response to a determination result that the second enqueueing time corresponding to the searched second user identifier is not coincident with the first enqueueing time corresponding to the target first user identifier, determine that the current state of the target user is a requeued but not invited state; and send the invitation for allocating the predetermined resource object to the target user side in response to determining that the current state of the target user is the requeued but not invited state.

12. The computer device according to claim 7, wherein the processor, when loading and running the one or more computer programs, is caused to:

determine, based on a target first user identifier corresponding to the target user in the synchronization data, whether the local data comprises the second user identifier coincident with the target first user identifier;

in response to a determination result that the local data comprises the second user identifier coincident with the target first user identifier and a difference between a current time and a latest inviting time corresponding to a searched second user identifier being beyond a predetermined duration range, determine whether the second enqueueing time corresponding to the searched second user identifier is coincident with the first enqueueing time corresponding to the target first user identifier;

determine, in response to a determination result that the second enqueueing time corresponding to the searched second user identifier is coincident with the first enqueueing time corresponding to the target first user identifier, that the current state of the target user is an expired invitation state; and in response to determining that the current state of the target user is the expired invitation state, inhibit sending the invitation for allocating the predetermined resource object to the target user side, and cancel the first user data corresponding to the target user from the waiting queue.

13. The computer device according to claim 12, wherein the processor, when loading and running the one or more computer programs, is caused to:

in response to a determination result that the second enqueueing time corresponding to the searched second user identifier is not coincident with the first enqueueing time corresponding to the target first user identifier, determine that the current state of the target user is a requeued but not invited state; and send the invitation for allocating the predetermined resource object to the target user side in response to determining that the current state of the target user is the requeued but not invited state.

14. The non-transitory computer-readable storage medium according to claim 8, wherein the one or more computer programs, when loaded and run by a processor, cause the processor to:

determine, based on a target first user identifier corresponding to the target user in the synchronization data, whether the local data comprises the second user identifier coincident with the target first user identifier;

in response to a determination result that the local data does not comprise the second user identifier coincident with the target first user identifier, determine that the current state of the target user is an enqueued but not invited state; and send the invitation for allocating the predetermined resource object to the target user side in response to determining that the current state of the target user is the enqueued but not invited state.

15. The non-transitory computer-readable storage medium according to claim 8, wherein the one or more computer programs, when loaded and run by a processor, cause the processor to:

determine, based on a target first user identifier corresponding to the target user in the synchronization data, whether the local data comprises the second user identifier coincident with the target first user identifier;

in response to a determination result that the local data comprises the second user identifier coincident with the target first user identifier and a difference between a current time and a latest inviting time corresponding to a searched second user identifier being within a predetermined duration range, determine whether the second enqueueing time corresponding to the searched second user identifier is coincident with the first enqueueing time corresponding to the target first user identifier;

in response to a determination result that the second enqueueing time corresponding to the searched second user identifier is coincident with the first enqueueing time corresponding to the target first user identifier, determine that the current state of the target user is an invited state; and inhibit sending the invitation for allocating the predetermined resource object to the target user side in response to determining that the current state of the target user is the invited state.

16. The non-transitory computer-readable storage medium according to claim 8, wherein the one or more computer programs, when loaded and run by a processor, cause the processor to:

determine, based on a target first user identifier corresponding to the target user in the synchronization data, whether the local data comprises the second user identifier coincident with the target first user identifier;

in response to a determination result that the local data comprises the second user identifier coincident with the target first user identifier and a difference between a current time and a latest inviting time corresponding to a searched second user identifier being within a predetermined duration range, determine whether the second enqueueing time corresponding to the searched second user identifier is coincident with the first enqueueing time corresponding to the target first user identifier;

in response to a determination result that the second enqueueing time corresponding to the searched second user identifier is not coincident with the first enqueueing time corresponding to the target first user identifier, determine that the current state of the target user is a requeued but not invited state; and send the invitation for allocating the predetermined resource object to the target user side in response to determining that the current state of the target user is the requeued but not invited state.

17. The non-transitory computer-readable storage medium according to claim 8, wherein the one or more computer programs, when loaded and run by a processor, cause the processor to:

determine, based on a target first user identifier corresponding to the target user in the synchronization data, whether the local data comprises the second user identifier coincident with the target first user identifier;

in response to a determination result that the local data comprises the second user identifier coincident with the target first user identifier and a difference between a current time and a latest inviting time corresponding to a searched second user identifier being beyond a predetermined duration range, determine whether the second enqueueing time corresponding to the searched second user identifier is coincident with the first enqueueing time corresponding to the target first user identifier;

determine, in response to a determination result that the second enqueueing time corresponding to the searched second user identifier is coincident with the first enqueueing time corresponding to the target first user identifier, that the current state of the target user is an expired invitation state; and in response to determining that the current state of the target user is the expired invitation state, inhibit sending the invitation for allocating the predetermined resource object to the target user side, and cancel the first user data corresponding to the target user from the waiting queue.

18. The non-transitory computer-readable storage medium according to claim 17, wherein the one or more computer programs, when loaded and run by a processor, cause the processor to:
   in response to a determination result that the second enqueueing time corresponding to the searched second user identifier is not coincident with the first enqueueing time corresponding to the target first user identifier, determine that the current state of the target user is a requeued but not invited state; and
   send the invitation for allocating the predetermined resource object to the target user side in response to determining that the current state of the target user is the requeued but not invited state.

* * * * *